SUPERCONDUCTIVE AMPLIFIER DEVICES

Filed Nov. 12, 1965 2 Sheets-Sheet 1

Inventor:
Ivar Giaever,
by John F. Ahern
His Attorney.

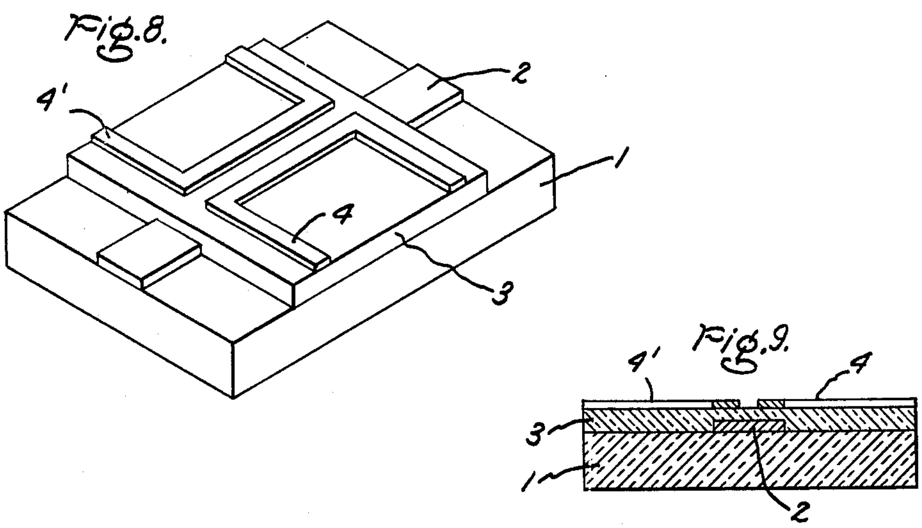
Fig. 8. Fig. 9.
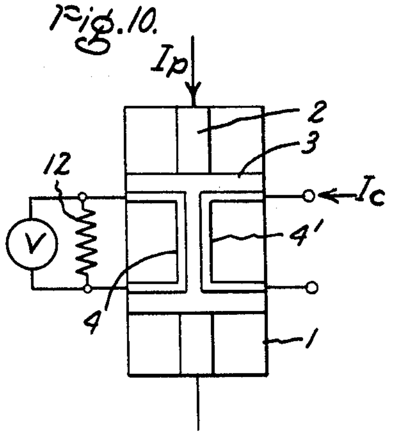
Fig. 10.
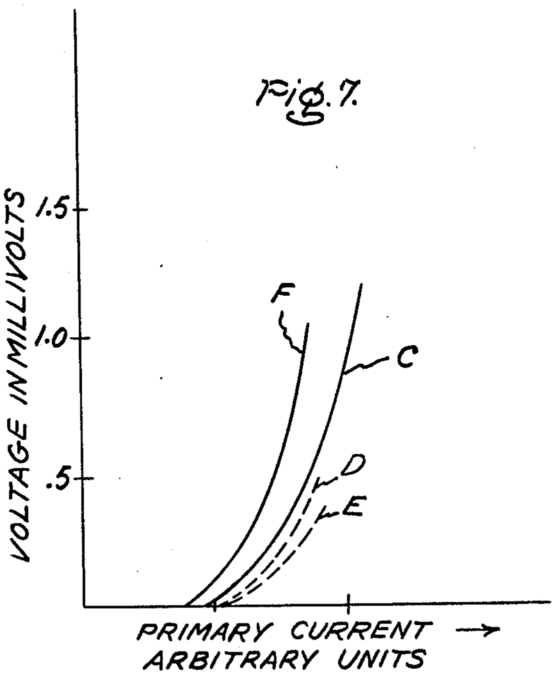
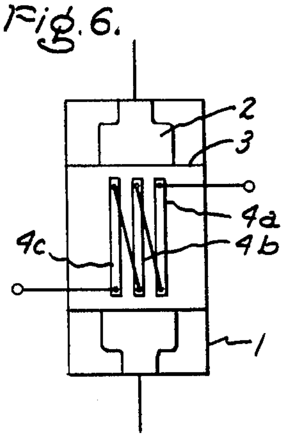
Fig. 6.
Inventor:
Ivar Giaever,
by John F. Ahern
His Attorney.

United States Patent Office 3,394,317

Patented July 23, 1968

3,394,317

SUPERCONDUCTIVE AMPLIFIER DEVICES

Ivar Giaever, Schenectady, N.Y., assignor to General Electric Company, a corporation of New York Filed Nov. 12, 1965, Ser. No. 507,299
12 Claims. (Cl. 330—62)

Figures 1, 2, 3, 4, 5:
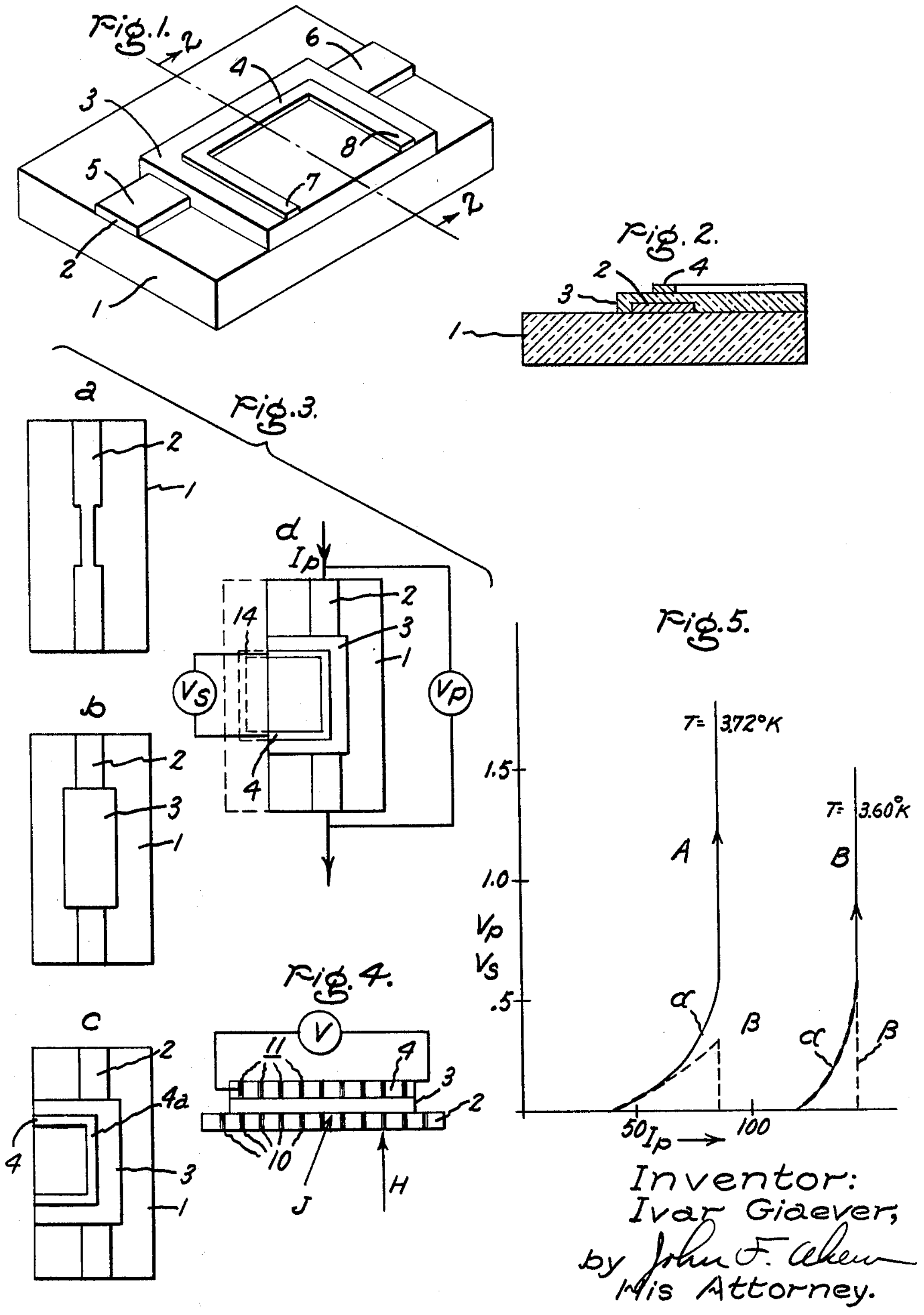

The present invention relates to improved electronic translating devices including as integral portions thereof a plurality of superconducting members. More particularly the invention relates to such devices wherein unidirectional voltages may be coupled from one such member to another through an insulating medium.

It is a primary object of the present invention to provide new and improved superconductive electronic devices including but not limited to direct current transformers, amplifiers, memory elements and the like.

Briefly stated, in accord with the present invention, I provide electronic devices including a plurality of superconductive members separated by a thin insulating film. The devices are operated at temperatures which insure that all of the superconducting members exist in a superconducting state. When a current which does not drive the element to which it is applied into the Normal state is passed therethrough, I am able to produce a D.C. voltage in the magnetically coupled element thereof. In accord with one feature of the present invention this operation may be utilized to produce a direct current analog of the alternating current transformer. In accord with another feature of the present invention, an added element may likewise be fluxed-coupled with the first and second member and the transmission of a direct current voltage from a first member to a second member may be controlled by a signal applied to the third member. Such a device may be operated as an amplifier.

The novel features believed characteristic of the present invention are set forth in the appended claims. The invention itself, together with further objects and advantages thereof may best be understood by reference to the accompanying drawings in which:

FIGURE 1 is a model perspective view of an electronic device constructed in accord with one embodiment of the present invention, FIGURE 2 is a cross-sectional view of the device of FIGURE 1, FIGURE 3 illustrates schematically the varying steps in the fabricating of the device of FIGURE 1, FIGURE 4 is a schematic diagram useful in explaining the operation of devices in accord with the invention, FIGURE 5 is a graph illustrating some current-voltage characteristics of the device of FIGURE 1, FIGURE 6 is a diagrammatic view of another embodiment of the invention, FIGURE 7 is a graph illustrating operating characteristics of the embodiment illustrated in FIGURE 6, FIGURE 8 is a perspective view of a model of another embodiment of the present invention, FIGURE 9 is a cross-sectional view of the device of FIGURE 8, and FIGURE 10 is a schematic view of the device of FIGURE 8 and the means for connecting such a device in circuit.

As is now well known in the art, a superconductor is a substance, either a metal, a compound, or an alloy which may exist in a resistive state or a non-resistive state. At temperatures above a given value superconductors exist in a Normal Resistive state wherein the relationship of resistance, current and voltage is determined substantially by Ohm's Law. On the other hand, in a superconductor cooled below a preselected value, which for all known superconductors is below 20° K., electrical resistance falls to zero and currents flow losslessly. Additional criteria for a superconductor existing in the superconducting state are that the current must be below a predetermined value because above this predetermined value, which depends upon the material, the characteristic of the body ceases to be superconductive. Still another necessary condition for superconductivity is that the magnetic field to which the superconductor is exposed not exceed a predetermined value, because above a predetermined value, which is dependent upon the superconductor, the material ceases to be superconductive.

Many materials are known to have superconducting characteristics. Approximately 25 elements and more than 300 alloys and compounds have been found to be superconductors. Superconductors do not all behave identically, even conceding the difference in the values of the predetermined currents, magnetic field strength, and temperatures at which superconduction ceases. This is because ideal superconductors exist in two states only, namely the superconducting state and the Normal state. The superconducting state for such superconductors is found below a value of temperature denominated the critical temperature or $T_c$, below a magnetic field strength denominated the critical field and identified as $H_c$ and below the critical current which is identified as $I_c$. When either one of the foregoing parameters has been exceeded for this type superconductor a sudden abrupt change in the characteristics of the body occurs, it ceases to be superconducting and becomes Normal.

In practice, many superconductors are known to exist in three different resistive states, namely the Superconductive, Intermediate or Mixed, and the Normal state. In the Superconducting state the resistance of the body is zero and current flows losslessly. In the Normal state the resistance of the body is resistive and Ohm's Law governs the relationship between voltage, current and resistance. In the Intermediate or Mixed state, the superconductor exhibits a finite resistance and is said to be resistive. However, this resistive state is not Normal and the relationship between voltage, current and resistance does not follow Ohm's Law.

One characteristic of a perfect superconductor is that it is completely diamagnetic and lines of flux of a magnetic field to which it is exposed do not pass therethrough but are forced to pass around the body. In the ideal superconductors described hereinbefore, when the superconducting state disappears the lines of flux go from a first condition in which they completely by-pass the body to a second condition in which they completely permeate the body. It has been proposed that the Intermediate or Mixed state of superconductors are states in which bundles of flux lines of a magnetic field to which the body is exposed pass through the body in discreet and limited regions. In the Intermediate or Mixed state of a superconductor one might say that the flux is quantitized. When the quantum of flux is unity, the quantitized flux lines or flux vortices have been denominated "fluxons." Superconductors characteristically having flux quanta of one are denominated Type II superconductors. Flux quanta of substantially higher numbers i.e. where each quantum of flux may have as many quanta as $10^6$ are characteristic of Type I superconductors. These fluxons, when they move create an electric field and cause the non-Normal resistive state of the superconductors. Some materials which exhibit this type of Mixed superconductive characteristic are impure metallic superconductors, any superconductor in a thin film structure and alloys such as Pb-In, Pb-Ga, BiPb, $Nb_3Su$, SnIn, PbSn, TlPb.

In accord with the present invention I have found it possible to provide electronic circuit elements which are adapted to couple unidirectional voltages from one superconductor member possessing a resistive but not Normal state through an insulating dielectric into another such layer. By virtue of this fundamental principle I am able to provide unidirectional voltage or D.C. transformers, memory elements, and unidirectional voltage or D.C. amplifiers. Many other electronic devices may be fabricated utilizing the principles which I have discovered and which are described in greater detail herein.

FIGURE 1 of the drawing illustrates in exaggerated detail an electronic superconducting device constructed in accord with the present invention. Since the device of FIGURE 1 is actually constructed of a plurality of thin films overlayed upon one another upon a suitable substrate, the thickness representations in FIGURE 1 are exaggerated. This is believed necessary, however, in order to illustrate the structure described. In FIGURE 1, substrate 1 has in serial order a first superconductor strip 2, insulating film 3 overlayed thereupon and, partially covering the same, a narrower film 4 also of a superconductor. Electrical contact is made to ends 5 and 6 of superconductor 2 and to ends 7 and 8 of superconductor 4. Superconductor films 2 and 4 may be of the same material.

FIGURE 2 of the drawing is a cross-sectional view taken along the line 2—2 in FIGURE 1 which further illustrates schematically the relative juxtaposition of substrate 1, superconductor 2, insulating layer 3, and second superconductor layer 4. Substrate 1 may be composed of any suitable non-electrically conducting substance which is able to withstand the thermal stress of superconducting temperatures of, for example, below 4° K. Typically such materials are $SiO_2$, $Bi_2O_3$, Pyrex glass and the high density alumina disclosed and claimed in Patent No. 3,026,210 issued to R. L. Coble. Superconductors 2 and 4 may be composed of any superconductive material which, in addition to exhibiting a Superconducting state and a Normal state, is also characterized by having the capacity of existing in an Intermediate or Mixed state which is resistive, but not normal, that is, in which it does not follow Ohm's Law. Such materials include all of the materials denominated as Type II superconductors and, additionally, also include impure deposits of Type I superconductive material. Thus for example, although tin is generally identified as a Type I superconductor, when tin is vacuum evaporated at a pressure $10^{-5}$ torr under conventional circumstances the vacuum evaporated film possesses either impurities or crystal imperfections or both, so as to cause it to possess a resistive state which renders it suitable for use in practice of this invention. Ideally, superconductor 2 should be in a very thin layer of, for example, a few thousand Angstrom units in thickness, although substantially thinner layers down to several hundred Angstroms are acceptable as are somewhat thicker layers.

Insulating layer 3 should be composed of a suitable insulating, non-conducting and non-reactive layer which may conveniently be vacuum evaporated, sputtered, sprayed or otherwise deposited upon the substrate and over layer of superconductor 2 with relative assurance of electrical and mechanical uniformity in relatively thin layers. Conveniently these layers should be of from 30 Angstrom units to 1000 Angstrom units in thickness although it is preferred that the minimum thickness not be lower than 100 Angstrom units. The significance of this will be described hereinafter. Superconductor 4 likewise comprises a thin film which may be as thin as possible and still maintain superconducting characteristics and should be at least approximately 100 Angstrom units in thickness and probably not greater than 10,000 Angstrom units and is preferably from approximately 500 to 1000 Angstrom units in thickness. As will be denoted hereinafter in greater detail, the geometry of superconductor 4 should be such that it is no wider than and preferably slightly narrower than the superconductor layer 2.

FIGURE 3 of the drawing illustrates in schematic sketches the step by step formation of a device such as that illustrated in FIGURE 1 of the drawing.

FIGURE 3*a* illustrates a first step with a superconducting film 4 deposited upon substrate 1. The film is restricted in the area in which the magnetic coupling will be affected so that when a critical current is reached and film 4 reverts to the Normal conducting state, it will be selectively so in this region. Devices in accord with the invention need not be constructed in this manner, however, but the data presented herein was taken with this particular configuration. In FIGURE 3*b* a layer 3 of silicon dioxide approximately 200 Angstrom units thick has been evaporated in vacuo over the tin superconducting layer 4. In FIGURE 3*c* a second superconducting layer 4 comprising a vacuum evaporated layer of tin approximately 500 Angstrom units thick is shown as being selectively vacuum evaporated over the top of insulating layer 3. It is to be noted that the longitudinal portion *4a* of superconducting film 4 is superposed over superconducting film 2 and is substantially narrower transversely than is superconducting film 2 in this region.

FIGURE 4 of the drawing illustrates a schematic model of the phenomenon which I have discovered and upon which the present invention is based. In FIGURE 4, a first superconducting layer 2 is overlayed with an insulating layer 3 and a second superconducting layer 4 is overlayed thereover. A current, illustrated by arrow J, flows normal to the page through superconductor 2. A voltmeter V is connected so as to be connected between two points aligned in a line normal to the page along superconducting layer 4. In other words, a first terminal of voltmeter V is connected close to the observer along film *4*, and a second connector is placed farther removed from the observer also along film *4*.

It has been explained that the phenomenon of the existence of a non-Normal resistive state in certain superconductors is due to the existence of a model of partial permeation of the superconductor by flux lines of a magnetic field to which the body is exposed. The flux lines may also be due to the current itself. This is illustrated schematically in FIGURE 4 in which flux vortices 10 are illustrated as penetrating through superconducting film 2 in only certain portions thereof. These so called flux vortices or "fluxons" cause the superconducting film to be resistive but, since they are quantitized and do not encompass the entire body, the conduction characteristics of the body are not normal and the body does not obey Ohm's Law. The thickness of film 2 is such that the flux vortices penetrate substantially from one surface to the other. I have found that this condition occurs when the thickness on film 2 is approximately from 100 to 10,000 Angstrom units and preferably from 500 to 1,500 Angstrom units.

As is set forth hereinbefore, the insulating film 3 may be approximately 30 to 1,000 Angstrom units in thickness. In my prior Patent No. 3,116,427, issued Dec. 31, 1963, I disclosed and explained a phenomenon of electrical conduction between two metallic layers, at least one of which was a superconductor, by the passage of electrical charges through a thin insulating layer. The operation of the invention disclosed in the aforementioned patent was based upon the passage of electrons by the quantum mechanical tunnelling process through the insulator. This required extremely thin insulating layers. It is difficult to set forth precisely a specific thickness at which tunnelling begins since it is a statistical phenomenon which is large, or massive, for very thin insulating layer thicknesses of for example up to 30 Angstrom units and is substantially smaller, or statistical, at greater thicknesses up to 1000 Angstrom units.

Although the present invention is practiced with thicknesses which are such that statistical tunnelling is permissible, the invention is properly practiced outside the realm of massive tunnelling effects. Accordingly I choose the thickness of the insulating layer 3 in the present invention to be at least 30 Angstrom units thick so that massive tunnelling effects will not take place and I allow the thickness to go as high as 10,000 Angstrom units.

It has further been explained that, when a fluxon or flux vortex structure exists in a superconductor having a non-normal resistive state, the flux vortices may be caused to move by the passage of a current through the superconductor. The direction of motion is mainly orthogonal to the magnetic field and the direction of current flow, since a major factor in causing the motion of the flux vortices is the vector force of $$\vec{J} \times \vec{B}$$

In the illustration of FIGURE 4, since J is into the paper and H is vertical upward, the flux vortices 10 within film 2 will move from left to right. The voltage is produced in superconductor 4 when the flux vortices cross the boundary of the film. Therefore the superconductor 4 should be equal or less in transverse dimension than superconductor 2.

I have discovered that, when insulating film 3 is sufficiently thin, the presence of flux vortices or fluxons 10 in film 2 causes the existence of induced flux vortices or fluxons 11 in film 4 which fluxons are coupled with the fluxons in film 10. When the fluxons in film 2 move, the coupled fluxons 11 in film 4 similarly move. The motion of fluxons 11 within film 4 is analogous to the motion of a wire within a magnetic field and results in the creation of a measurable voltage at voltmeter V. This result is analogous to the "build-up" and "collapsing" of magnetic fields present in an alternating-voltage applied to one of two magnetically coupled conductors. In this case, however I have found it possible, through the use of superconductor strips of a superconductor which exists in the Mixed state, to cause the induction of a unidirectional or D.C. voltage in a second member by the passage of a current through the first member by the application of a unidirectional or D.C. voltage thereto. This device in its most fundamental form is an example of D.C. or unidirectional voltage transformation.

FIGURE 5 illustrates curves of voltages induced by the passage of a unidirectional current through the superconductor film 2, which shall henceforth be referred to as the "primary" and the unidirectional voltage which is induced in superconductor film 4 which hereinafter shall be referred to as the secondary. In FIGURE 5, both the voltage applied to the primary, $V_p$ and the voltage induced within the secondary, $V_s$, are plotted as ordinates and the current in the primary is plotted as the abscissa. In the set of curves denominated as A the $V_p$–$I_p$ curve is identified as $\alpha$ and the $V_s$–$I_p$ curve is denominated as $\beta$.

In the voltage current characteristic of a Type II superconductor exhibiting a Mixed conduction state, the current initially increases with no indicated "voltage drop." This is the Superconducting state. At a given current, assuming constant magnetic field, and temperature values, the state of the material changes from Superconducting to Mixed and exhibits a resistive effect. Similarly, in a Type I superconductor at the transition point the body changes from the Superconducting to the Intermediate state. Accordingly a "voltage drop" is observed in the primary. This voltage gradually rises until a significant current value is reached, at which the current voltage curve rises almost vertically until the condition of the material has returned to the Normal resistive state and further increases in current or voltage cause the corresponding parameter to vary in accord with Ohm's Law. In both sets of curves A and B of FIGURE 5 this latter point is off-scale and we deal only with the initial stages during which the material is in either the Superconducting or the Mixed state. The measurements upon which these curves are based were taken with the device submerged in a bath of liquid helium (not shown) and connected as shown in FIGURE 3*d* of the drawing.

As a further embodiment of the invention, the secondary 4 in FIGURE 3*d* may be made into a closed loop by adding film 14, shown in dotted lines on FIGURE 3*d*, over an elongated substrate, also shown in dotted lines, to form a superconducting memory element which retains a circulatory current so long as the secondary 4 is in the Superconducting state.

In the set of curves denominated A in FIGURE 5 it may be seen that curve $\alpha$, primary voltage versus primary current, rising until the significant point is reached at which time Mixed conductivity characteristics cease. As may be seen from the curve $\beta$ a voltage is induced in the secondary of the device of FIGURE 1 by the passage of a current in the primary thereof. This voltage is equal to the voltage on the primary with low currents but falls off somewhat, an effect believed due to heating effects because of the passage of the primary current. This set of curves is obtained for the device of FIGURE 1 maintained at an absolute temperature of 3.72° Kelvin. In the curves of FIGURE B both the $\alpha$ and $\beta$ curves behave identically and are indistinguishable with the exception that, when the device passes from the Mixed state to the Normal state, the voltage curve in the primary increases rapidly, signifying the return to the Normal conductivity, whereas the voltage within the secondary, curve $\beta$, falls to zero since the electromagnetic coupling is eliminated when the device goes normal. The curves B were taken at a temperature of 3.60° Kelvin.

FIGURE 6 of the drawing illustrates schematically, a modification of the structure of the device as illustrated by FIGURES 1, 2, and 3 of the drawing, which modification is adapted to produce a higher voltage in the secondary than the voltage applied to the primary. In FIGURE 6, a primary superconductor strip 2 is overlayed upon an insulating substrate 1. Rather than being constricted at the portion thereof that is utilized, the layer 2 is made wide thereat so as to accommodate a plurality of secondary strips. A film 3 of insulating substrate is overlayed on top of superconductor primary 2 and a plurality of electrically insulated, longitudinally parallel secondary superconductor films **4*a*, 4*b* and 4*c* are overlayed upon insulator 3. These films may be formed by vacuum evaporation through a mask or a single strip film of superconductor may be formed by vacuum evaporation and after portions thereof are masked, the remainder may be etched away. Alternatively the films may be cut with a suitable sharp instrument to provide the desired geometry. The opposite ends of adjacent secondary strips 4*a*, 4*b* and 4*c*** are joined together by connecting a Normal metallic wire thereto so that the effective length of the secondary is, in this instance, three times the length of the primary and may, in theory be any multiple thereof.

FIGURE 7 of the drawing illustrates the voltage current characteristics of a device similar to that illustrated in FIGURE 6 and having two primary strips. In FIGURE 7, the voltage characteristics of the primary, of the two secondaries separately, and of the two secondaries additively are represented by curves C to F respectively. Since, by electrically connecting the individual strips in series as is illustrated in FIGURE 6, the voltages become additive, curve F represents the total secondary voltage obtained from one such device actually constructed in accord with the illustration of FIGURE 6 and having two secondary strips. All voltages are plotted against the same values of current in arbitrary units, for purposes of normalization of the voltages for sake of comparison.

In accord with another feature of my invention I provide for a new type of amplifier which has low input and output impedances and which is capable of almost infinite power gain. An amplifier constructed in accord with this embodiment of my invention is illustrated in perspective and exaggerated model form in FIGURE 8 of the drawing; and in vertical cross-section in FIGURE 9.

In FIGURE 8 an insulating substrate 1 has deposited thereupon a film 2 of a first superconductive material which exhibits a Mixed characteristic at some value of current, temperature, and magnetic field. Overlying superconductor 2 I deposit a film of insulating material 3 which is of the same material and serves the same purpose as insulating material 3 in the embodiment of the invention illustrated graphically in FIGURE 1. In further accord with this embodiment of the invention a pair of loops of a superconducting material which exhibits a Mixed conduction state and which, for convenience, may be of the same superconductive material as film layer 3, as for example tin, are vacuum evaporated or otherwise deposited upon the surface of layer 3. The thicknesses of layers 2, 3, and 4 in this embodiment of the invention follow the same criteria as is set forth hereinbefore with respect to the device of FIGURE 1. The operation of the device of FIGURE 1 may be duplicated by applying a unidirectional or D.C. voltage to the terminals of superconductive film 2 and observing the unidirectional voltage which is induced in superconductor film secondary 4 at the terminals thereof. In addition to secondary 4, a separate, electrically-insulated secondary 4′ is also in the field of influence of superconductor primary film 2 and may exercise an influence thereover. As is set forth hereinbefore, the coupling between the primary and secondary superconducting films is caused by the induction of fluxons in the secondary thereof and the motion of the fluxons in the secondary caused by motion of the fluxons in the primary. The coupling between the films is a sensitive function and is related to the thickness of the insulating layer, which thickness should in approximate terms be less than the spacing between fluxons in the primary superconductor film. By applying a perpendicular magnetic field to the films, the fluxons are caused to be more closely spaced, since the primary superconductor more closely approaches the Normal state. As a consequence of more closely spacing fluxons, the coupling between the films decreases. Likewise, when the magnetic field is reduced, the coupling between the films increases. Thus it becomes a reality that one may vary the coupling at will between the primary and secondary of the device as is illustrated in FIGURE 1 by artificially and systematically controlling the magnetic field. This is done quite simply by applying a separate unidirectional voltage to superconductor 4′, causing the flow of current therethrough and the establishment of a magnetic field. Under these circumstances a circuit arrangement as illustrated in FIGURE 10 is possible with a power supplying primary current $I_p$ flowing within primary superconductor film 2. A control current $I_c$ is connected to flow within control superconductive film 4′ and an output is obtained across resistance 12 and measured by voltmeter V. Since the resistance of the control strip may be made zero a very small change in the control power may result in very large changes in output power.

In the foregoing I have set forth in detail certain specific characteristics of my invention which I believe are descriptive of a new phenomenon and a new mode of operation for the achievement of results not heretofore achieved. I have shown it possible that unidirectional or D.C. voltages may be induced from one conductor through an insulating dielectric into another conductor when both are in the Intermediate or Mixed superconducting state and that a type of electronic translating device such as an amplifier may readily be constructed in accord with the principles set forth herein.

While I have disclosed the specific embodiments of my invention, and have set forth certain examples thereof, many modifications and changes will readily become apparent to those skilled in the art. Accordingly by the appended claims I intend to cover all such modifications and changes as fall within the true spirit and scope of the foregoing disclosure.

What I claim as new and desire to secure by Letters Patent of the United States is:

1. An electronic translating device comprising thin first and second superconducting elements separated by a thin insulating film at least 30 Angstrom units in thickness, said superconducting elements being formed of substances which exhibit a conductivity state that is resistive but not Normal; means for maintaining said device at a temperature at which said conductivity state may exist within said superconducting elements; means for passing a unidirectional current through said first element to flux-couple said elements and induce a unidirectional voltage in said second element.

2. An electronic translating device comprising first and second superconductor elements, said elements being formed of material and in such forms as to be capable of existing in a Superconducting state, a Normal resistive state or a Mixed or Intermediate state in which its conduction characteristics are resistive but not Normal; a film of an insulator separating said elements and being of sufficient thickness as to preclude massive quantum mechanical tunnelling of electric charges therethrough, but thin enough to permit flux-coupling of said elements; means for maintaining said device at a temperature of sufficiently low value as to permit the conductivity characteristics of said elements to be resistive but not Normal; means for passing a unidirectional current through one of said elements and of such a value to cause conductivity and the flux-coupling of said elements; and means for utilizing a unidirectional voltage generated within said second element by the passage of current in said first element.

3. The device of claim 2 wherein the insulating film has a thickness of from 30 to 1000 Angstrom units.

4. The device of claim 2 wherein the insulating film has a thickness of from 100 to 500 Angstrom units.

5. The device of claim 2 wherein said device is maintained at a temperature of less than 4° K.

6. The device of claim 2 wherein both of said elements are of a finite thickness but no thicker than 1000 Angstrom units.

7. The device of claim 2 wherein the second of said elements has a thickness of between 500 and 1000 Angstrom units.

8. The device of claim 2 wherein said superconductor is a Type I superconductor and exists in the Intermediate state.

9. The device of claim 2 wherein said superconductor is a Type II superconductor and operates in the Mixed state.

10. An electronic signal device comprising thin first and second superconducting elements separated by a thin insulating film at least 30 Angstrom units in thickness, said superconducting elements being formed of substances which exhibit a conductivity state that is resistive but not Normal; means for maintaining said device at a temperature at which said conductivity state may exist within said superconducting elements; means for passing a current of the type selected from the group consisting of unidirectional and alternating through said first element to flux-couple said elements and induce a corresponding type voltage in said second element.

11. A superconducting memory device comprising a first thin superconductor element upon a non-conducting substrate; a thin insulating film at least 30 Angstrom units in thickness overlying said superconductor film; a second superconductor element in the form of a closed loop one leg of which is flux-coupled with said first superconductor element through said insulating film, deposited upon said insulating layer; said superconductor elements being formed of superconductors which exhibit a conductivity state that is resistive but not Normal; means for maintaining said device at a temperature at which said conductivity state exists within said superconductor elements; and means for passing an electric current through said first sperconductor element to cause the induction within said second loop shaped superconductor element of a circulatory current which is characteristic of the nature of the current passed through said first superconductor element and which may be maintained indefinitely therein so long as the device is maintained in the Superconducting state.

12. A superconducting amplifier device comprising a primary superconductor element deposited upon an insulating substrate; a thin insulating film of at least 30 angstrom units in thickness overlaying said first superconductor film; a first secondary superconductor element deposited upon said insulating film and flux-coupled with said primary superconductor element, a second secondary superconductor element electrically insulated from said first secondary superconductor element also deposited upon said insulating film and flux-coupled with said primary superconductor element; means for passing an electric current through said primary superconductor element; means for connecting a utilization circuit to said first secondary superconductor element and means for impressing a modulating signal upon said primary superconductor element and upon said first secondary superconducting element by passing an electric current through said secondary superconductor element; and means for maintaining said device at a temperature at which said superconductor elements exist in a conductivity state that is resistive but not Normal.

References Cited

UNITED STATES PATENTS

| | | | |
|---|---|---|---|
| 2,983,889 | 5/1961 | Green | 338—32 |
| 3,214 679 | 10/1965 | Richards | 323—44 |
| 3,275,843 | 9/1966 | Meyerhoff | 307—245 |
| 3,305,819 | 2/1967 | Brice et al. | 338—32 |

ROY LAKE, *Primary Examiner.*

NATHAN KAUFMAN, *Assistant Examiner.*